US009454352B2

(12) United States Patent
Dingsor et al.

(10) Patent No.: US 9,454,352 B2
(45) Date of Patent: Sep. 27, 2016

(54) WORKLOAD DEPLOYMENT DENSITY MANAGEMENT FOR A MULTI-STAGE COMPUTING ARCHITECTURE IMPLEMENTED WITHIN A MULTI-TENANT COMPUTING ENVIRONMENT

(71) Applicant: International Business Machines Corporation, Armonk, NY (US)

(72) Inventors: Andrew D. Dingsor, Durham, NC (US); Todd E. Kaplinger, Raleigh, NC (US); Michael R. Rheinheimer, Cedar Park, TX (US); Gal Shachor, Yokneam (IL); Artem Spector, Rishon Le-Zion (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/708,506

(22) Filed: May 11, 2015

(65) Prior Publication Data
US 2016/0127453 A1    May 5, 2016

Related U.S. Application Data

(63) Continuation of application No. 14/530,938, filed on Nov. 3, 2014.

(51) Int. Cl.
*G06F 9/445* (2006.01)
*H04L 29/08* (2006.01)

(52) U.S. Cl.
CPC ............... *G06F 8/60* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 8,312,419 B2 | 11/2012 | Wilcock et al. | |
| 8,321,352 B1 * | 11/2012 | Rameshkumar | G06F 21/12 705/51 |
| 2013/0232497 A1 | 9/2013 | Jalagam et al. | |
| 2015/0199197 A1 * | 7/2015 | Maes | G06F 8/71 717/122 |

* cited by examiner

*Primary Examiner* — Daxin Wu
(74) *Attorney, Agent, or Firm* — Steven M. Greenberg, Esq.; CRGO Law

(57) ABSTRACT

Embodiments of the present invention provide a method, system and computer program product for workload deployment density management for a multi-stage architecture implemented within a multi-tenant computing environment. The method includes receiving different requests from different tenants of a multi-tenant computing environment to deploy respectively different application instances of respectively different computer programs into different nodes of the host computing system. The method also includes determining from each request an associated stage of a software lifecycle for a corresponding one of the application instances. Finally, the method includes deploying each of the application instances into a particular one of the nodes depending upon an associated stage of each of the application instances so that each of the nodes hosts different application instances for different tenants of a common stage of the software lifecycle.

6 Claims, 2 Drawing Sheets

WORKLOAD DEPLOYMENT DENSITY MANAGEMENT FOR A MULTI-STAGE COMPUTING ARCHITECTURE IMPLEMENTED WITHIN A MULTI-TENANT COMPUTING ENVIRONMENT

BACKGROUND OF THE INVENTION

1. Field of the Invention

The present invention relates to cloud based computing and more particularly to workload deployment in a multi-stage computing architecture implemented as a cloud based computing service.

2. Description of the Related Art

The software lifecycle of a computer program begins with development and ends with production and maintenance. In between development and production and maintenance can be found the testing phase and optionally the staging phase. Different instances of the same computer program can exist simultaneously to the extent that an instance experiencing software development and an instance in production utilized by end users are segregated so that development, testing and maintenance operations performed upon an instance of a computer program during software development do not affect the instance of computer program in production utilized by end users. A multi-stage computing architecture facilitates the segregation of the simultaneously co-existing instances of the computer program.

A multi-stage computing architecture is a computing architecture in which the deployment of different instances of a computer program are separated according to the different stage contemporaneously experienced by an instance of the computer program. In a multi-stage computing architecture, different nodes are provided such that each node is an isolated computing space configured to host the execution of an instance of a computer program. The nodes can be correspondingly different physical servers communicatively coupled to one another over a data communications network, or correspondingly different virtual machines executing in one or more physical servers coupled to one another over a data communications network, or a combination thereof. In the multi-stage computing architecture, a selected one of the nodes can host an instance of a computing application in accordance with its stage of the software lifecycle so as to not interfere with another executing instance of the computing application in a different one of the nodes at a different stage of the software lifecycle.

The multi-stage computing architecture traditionally is implemented in a dedicated private server farm associated with the deployment of one or more applications of a single organization. However, the advent of cloud computing and the "Platform as a Service" (PaaS) model has resulted in a number of organizations lacking the resources to support a dedicated private server farm, but with the need to utilize a multi-stage computing architecture. In this regard, in the PaaS model, a computing platform that includes one or more physical servers accessible over the global Internet is provided for use by different "tenants" in a multi-tenant computing environment. Each tenant deploys one or more application instances to the computing platform unawares of the co-execution of other application instances in the same computing platform by other tenants.

The PaaS model is not without its challenges. In a private, server farm, one end user controls common access to the computing resources of the server farm with a priori knowledge of the resource needs of each application instance since the end user also controls all of the applications instances. In comparison, in a multi-tenant computing environment the deployment of an application instance to the platform by a given tenant is not always known a priori by the host of the multi-tenant computing environment. Therefore, a degree of cooperation and coordination amongst the tenants is lacking though essential to optimizing utilization of the multi-tenant computing environment.

BRIEF SUMMARY OF THE INVENTION

Embodiments of the present invention address deficiencies of the art in respect to managing a multi-stage computing architecture implemented amidst a multi-tenant computing environment and provide a novel and non-obvious method, system and computer program product for workload deployment density management for a multi-stage architecture implemented within a multi-tenant computing environment. In an embodiment of the invention, a method for workload deployment density management for a multi-stage computing architecture implemented within a multi-tenant computing environment includes receiving different requests from different tenants of a multi-tenant computing environment to deploy respectively different application instances of respectively different computer programs into different nodes of the host computing system. The method also includes determining from each request an associated stage of a software lifecycle for a corresponding one of the application instances. Finally, the method includes deploying each of the application instances into a particular one of the nodes depending upon an associated stage of each of the application instances so that each of the nodes hosts different application instances for different tenants of a common stage of the software lifecycle.

In one aspect of the embodiment, the method additionally can include determining from each request a scaling policy for the corresponding one of the application instances and deploying each of the application instances into the particular one of the nodes depending not only upon the associated stage of each of the application instances so that each of the nodes hosts different application instances for different tenants of a common stage of the software lifecycle, but also upon the scaling policy. In another aspect of the embodiment, the method additionally can include determining from each request a known utilization of the corresponding one of the application instances and deploying each of the application instances into the particular one of the nodes depending not only upon the associated stage of each of the application instances so that each of the nodes hosts different application instances for different tenants of a common stage of the software lifecycle, but also upon the known utilization. In yet another aspect of the embodiment, both the scaling policy and the utilization can be considered in addition to the associated stage when deploying application instances into the nodes of the multi-tenant computing environment.

Another embodiment of the invention includes a multi-tenant data processing system. The system is configured for workload deployment density management for a multi-stage computing architecture and includes a host computing system that includes multiple different host computers, each with memory and at least one processor. The system also includes a cloud computing environment defined by a multiplicity of computing nodes executing within the host computing system, each of the nodes providing an operating system configured to support the operation of different instances of different applications. The system yet further includes a multi-tenant computing environment configured to utilize the computing nodes of the cloud computing environment on behalf of different tenants.

Finally, the system includes a cloud node agent coupled to the multi-tenant computing environment. The agent includes program code enabled upon execution in the host computing system to receive different requests from different ones of the tenants to deploy respectively different application instances of respectively different computer programs into different ones of the nodes, to determine from each request an associated stage of a software lifecycle for a corresponding one of the application instances, and to deploy each of the application instances into a particular one of the nodes depending upon an associated stage of each of the application instances so that each of the nodes hosts different application instances for different tenants of a common stage of the software lifecycle.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for workload deployment density management for a multi-stage computing architecture implemented within a multi-tenant computing environment. In accordance with an embodiment of the invention, a multi-stage computing environment can be implemented in at least two nodes of a host computing system of one or more physical servers, each with memory and at least one processor, each of the nodes corresponding to a different stage of a software lifecycle. Additionally, a multi-tenant computing architecture can be implemented in the host computing system with different tenants deploying different application instances of different applications into the nodes of the host computing system. In this regard, each of the nodes can be optimally configured to support application instances of a specific stage of the software lifecycle.

Importantly, a cloud node agent can execute in the memory of the host computing system. The cloud agent can deploy different application instances of different computer programs for the tenants into different ones of the nodes dependent upon a stage of the software lifecycle corresponding to each of the application instances. However, irrespective of the tenant, the cloud node agent can deploy application instances of like stage into a common one of the nodes. In this way, an optimal deployment density can be achieved amongst the nodes of the multi-tenant computing environment when deploying application instances of different the different tenants into a multi-stage computing architecture.

Figure 1:
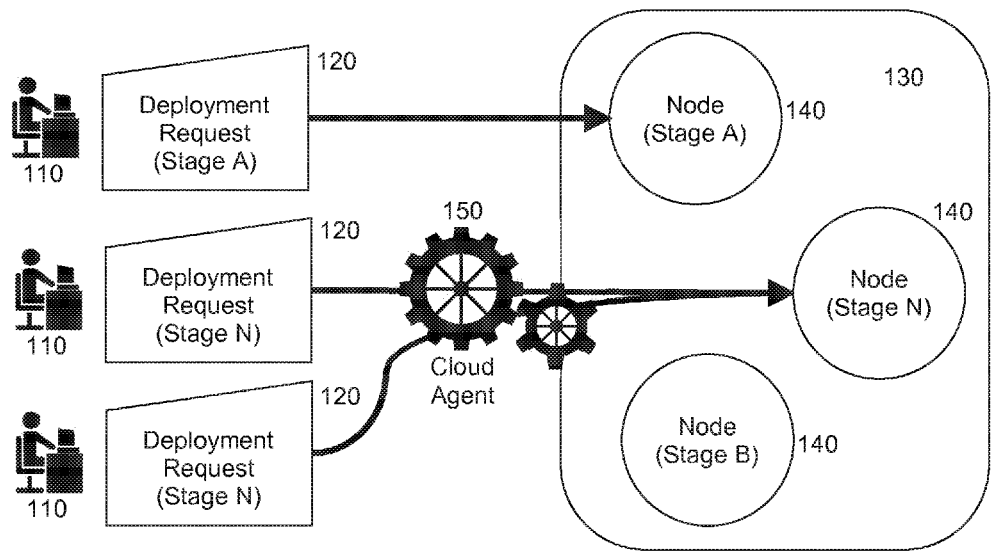
FIG. 1 is a pictorial illustration of a process for workload deployment density management for a multi-stage computing architecture implemented within a multi-tenant computing environment.

In further illustration, FIG. 1 pictorially shows a process for workload deployment density management for a multi-stage computing architecture implemented within a multi-tenant computing environment. As shown in FIG. 1, a multi-tenant computing environment 130 can be established to include several different computing nodes 140 into which different instances of different applications can be deployed on behalf of different tenants 110 of the multi-tenant computing environment 130. The different tenants 110 can issue different requests 120 to deploy different instances of different applications into the nodes 140 of the multi-tenant computing environment 130. Importantly, cloud agent 150 can process each of the requests 120 in order to determine in which of the nodes 140 each requested instance of the different applications is to be deployed. Specifically, the cloud agent 150 can identify a stage of the software lifecycle associated with each of the requests 120 and can select one of the nodes 140 corresponding to the identified stage such that instances of like stage are deployed into a common one of the nodes 140.

Figure 2:
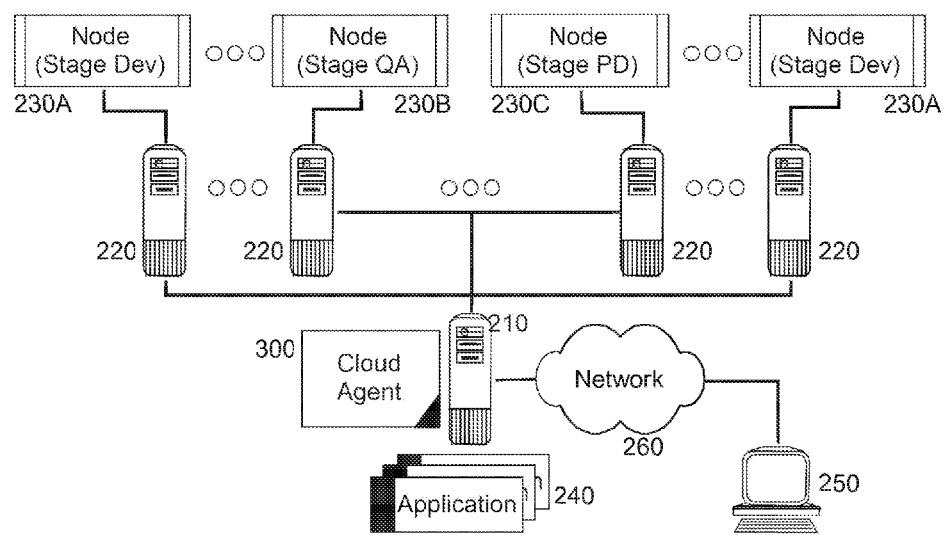
FIG. 2 is a schematic illustration of a multi-tenant data processing system configured for workload deployment density management for a multi-stage computing architecture; and, FIG. 3 is a flow chart illustrating a process for workload deployment density management for a multi-stage computing architecture implemented within a multi-tenant computing environment.

The process described in connection with FIG. 1 can be implemented in a multi-tenant data processing system. In further illustration, FIG. 2 schematically shows a multi-tenant data processing system configured for workload deployment density management for a multi-stage computing architecture. The system can include a host computing system 210 that can include one or more computers each with memory and at least one processor. The host computing system 210 can be coupled by a private computer communications network to different servers 220 respectively supporting one or more different nodes 230A, 230B, 230C of a multi-tenant computing environment into which different instances of different applications 240 for different tenants can be deployed.

A cloud agent 300 can execute in the memory of the host computing system 210 and can receive from over external computer communications network 260 from a client device 250 a request to deploy an instance of one of the applications 240 to the multi-tenant computing environment. Program code of the cloud agent 300 can identify a stage of the software lifecycle for the request and based upon the identified stage, a corresponding one of the nodes 230A, 230B, 230C can be selected designated to instances of the applications of a common stage of the lifecycle equivalent to the identified stage. For example, instances of the applications 240 in a development stage can be assigned to one of the nodes 230A, while instances of the applications 240 in a quality assurance stage can be assigned to one of the nodes 230B, while instances of the applications 240 in a production stage can be assigned to one of the nodes 230C.

Figure 3:
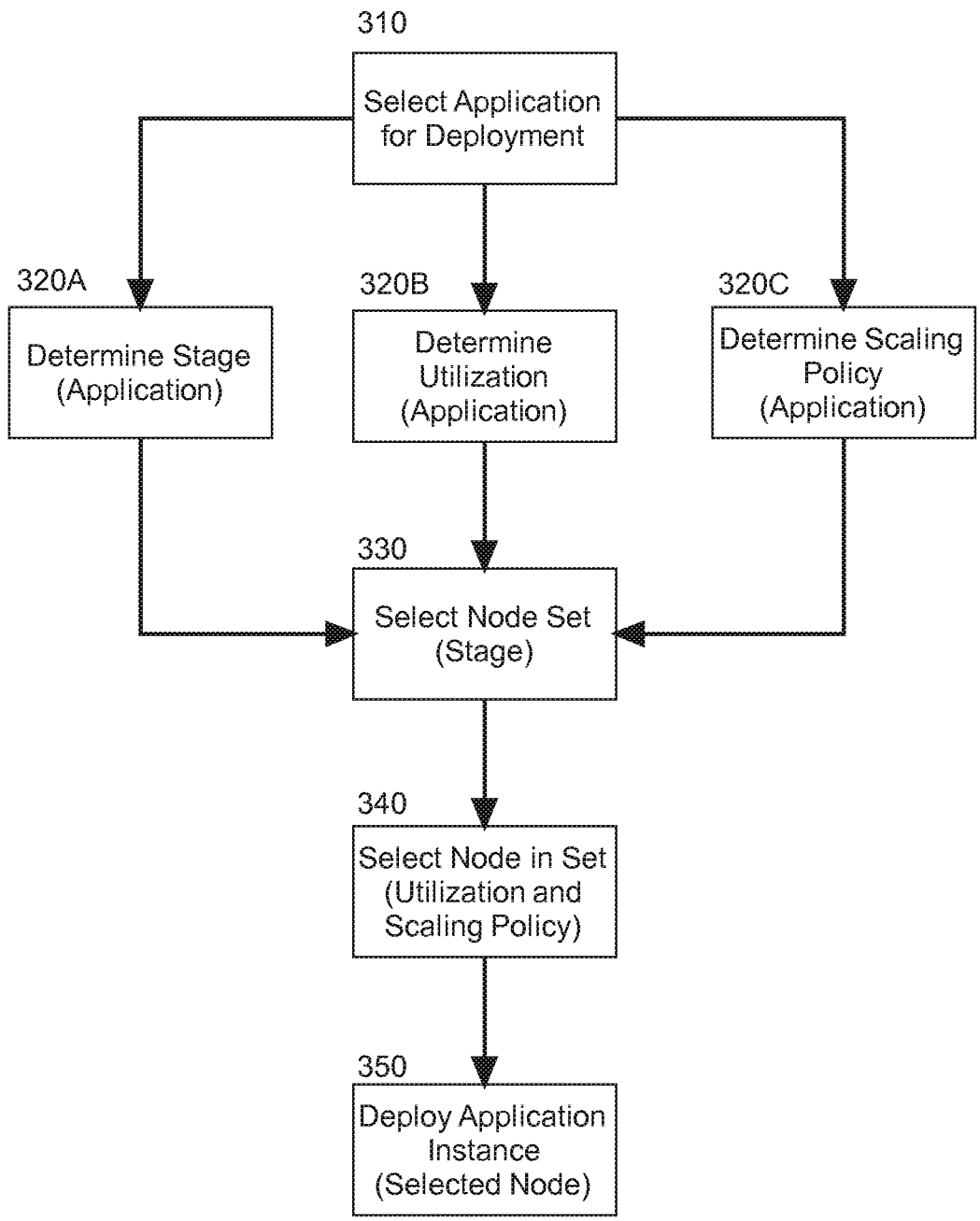

In even yet further illustration of the operation of the program code of the cloud agent 300, FIG. 3 is a flow chart illustrating a process for workload deployment density management for a multi-stage computing architecture implemented within a multi-tenant computing environment. Beginning in block 310, an application instance of an application can be selected for deployment into a multi-tenant computing environment. In block 320A, a stage associated with the request to deploy the instance of the application can be identified and in block 320B, an expected utilization of the instance of the application can be determined. Yet further, in block 320C, a scaling policy can be retrieved in association with the application.

In block 330, a set of nodes hosting application instances of a particular common stage can be selected to be consistent with the identified stage of the request to deploy the instance of the application. Thereafter, one of the nodes in the set can be selected as optimal to meet the expected utilization and retrieved scaling policy for the instance of the application. Once the node has been selected, the requested instance of the application can be deployed to the selected node. In this way, different instances of different applications in the multi-tenant computing environment can be grouped together into a common node configured not only to accommodate the common operating needs of the instances resulting from the particular stage of the software lifecycle common to the instances, but also to accommodate the common operating needs of instances of similar expected utilization and similar scaling policy.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for workload deployment density management for a multi-stage computing architecture implemented within a multi-tenant computing environment, the method comprising:

receiving different requests from different tenants of a multi-tenant computing environment executing in memory of a host computing system of one or more physical servers each with memory and at least one processor, to deploy respectively different application instances of respectively different computer programs into different nodes of the host computing system;

determining from each request an associated stage of a software lifecycle for a corresponding one of the application instances; and, deploying each of the application instances into a particular one of the nodes depending upon an associated stage of each of the application instances so that each of the nodes hosts different application instances for different tenants of a common stage of the software lifecycle.

2. The method of claim 1, wherein the nodes comprise at least a production node and a development node.

3. The method of claim 2, wherein the nodes further comprise a quality assurance node.

4. The method of claim 1, further comprising:

determining from each request a scaling policy for the corresponding one of the application instances; and, deploying each of the application instances into the particular one of the nodes depending not only upon the associated stage of each of the application instances so that each of the nodes hosts different application instances for different tenants of a common stage of the software lifecycle, but also upon the scaling policy.

5. The method of claim 1, further comprising:

determining from each request a known utilization of the corresponding one of the application instances; and, deploying each of the application instances into the particular one of the nodes depending not only upon the associated stage of each of the application instances so that each of the nodes hosts different application instances for different tenants of a common stage of the software lifecycle, but also upon the known utilization.

6. The method of claim 4, further comprising:

determining from each request a known utilization of the corresponding one of the application instances; and, deploying each of the application instances into the particular one of the nodes depending not only upon the scaling policy and the associated stage of each of the application instances so that each of the nodes hosts different application instances for different tenants of a common stage of the software lifecycle, but also upon the known utilization.

* * * * *